US012738545B2

(12) United States Patent
Oh et al.

(10) Patent No.: US 12,738,545 B2
(45) Date of Patent: Sep. 15, 2026

(54) ELECTRODE ASSEMBLY

(71) Applicant: LG Energy Solution, Ltd., Seoul (KR)

(72) Inventors: Se Young Oh, Daejeon (KR); Jeong Min Ha, Daejeon (KR); Geun Hee Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 728 days.

(21) Appl. No.: 18/032,288

(22) PCT Filed: Oct. 18, 2021

(86) PCT No.: PCT/KR2021/014508
§ 371 (c)(1),
(2) Date: Apr. 17, 2023

(87) PCT Pub. No.: WO2022/086096
PCT Pub. Date: Apr. 28, 2022

(65) Prior Publication Data

US 2023/0395868 A1 Dec. 7, 2023

(30) Foreign Application Priority Data

Oct. 19, 2020 (KR) ........................ 10-2020-0135121

(51) Int. Cl.
*H01M 10/0585* (2010.01)
*H01M 10/04* (2006.01)

(52) U.S. Cl.
CPC ... *H01M 10/0585* (2013.01); *H01M 10/0413* (2013.01); *H01M 10/0436* (2013.01)

(58) Field of Classification Search
CPC ......... H01M 10/0413; H01M 10/0436; H01M 10/0585
See application file for complete search history.

(56) References Cited

U.S. PATENT DOCUMENTS

| | | | |
|---|---|---|---|
| 2001/0041288 A1 | 11/2001 | Onishi et al. | |
| 2003/0087150 A1 | 5/2003 | Chung | |
| 2011/0170234 A1 | 7/2011 | Lee et al. | |
| 2015/0155589 A1 | 6/2015 | Suh et al. | |
| 2017/0018753 A1 | 1/2017 | Minagata et al. | |
| 2018/0115013 A1* | 4/2018 | Matsumoto | B32B 37/06 |

(Continued)

FOREIGN PATENT DOCUMENTS

| | | | |
|---|---|---|---|
| CN | 105514352 A * | 4/2016 | H01M 10/0583 |
| EP | 3300140 A1 * | 3/2018 | H01M 4/628 |

(Continued)

OTHER PUBLICATIONS

Extended European Search Report including Written Opinion for Application No. 21883165.9 dated Dec. 9, 2024, pp. 1-13.

(Continued)

*Primary Examiner* — Kevin E Yoon
(74) *Attorney, Agent, or Firm* — Lerner David LLP

(57) ABSTRACT

An electrode assembly includes an electrode stack formed by alternately stacking an electrode and a separator, and an outer tape attached to an outer surface of the electrode stack. The outer tape is attached to the electrode stack to surround a side surface thereof, and a through-hole is formed in a first region of the outer tape which is present at a position corresponding to the side surface of the electrode stack.

12 Claims, 3 Drawing Sheets

(56) References Cited

U.S. PATENT DOCUMENTS

| | | | | |
|---|---|---|---|---|
| 2019/0067668 | A1* | 2/2019 | Jang | H01M 50/534 |
| 2020/0144650 | A1 | 5/2020 | Kim et al. | |

FOREIGN PATENT DOCUMENTS

| | | | |
|---|---|---|---|
| JP | H10241744 | A | 9/1998 |
| JP | 2001307760 | A | 11/2001 |
| JP | 2002198099 | A | 7/2002 |
| JP | 2015109260 | A | 6/2015 |
| KR | 100467690 | B1 | 1/2005 |
| KR | 100529097 | B1 | 11/2005 |
| KR | 20110082934 | A | 7/2011 |
| KR | 20140032713 | A | 3/2014 |
| KR | 101787632 | B1 | 10/2017 |
| KR | 20180041979 | A | 4/2018 |
| KR | 20180064778 | A | 6/2018 |
| KR | 20190071129 | A | 6/2019 |
| KR | 20200052060 | A | 5/2020 |
| WO | 2015137060 | A1 | 9/2015 |
| WO | 2018074773 | A1 | 4/2018 |

OTHER PUBLICATIONS

International Search Report for Application No. PCT/KR2021/014508 mailed Jan. 28, 2022, pp. 1-3.

* cited by examiner

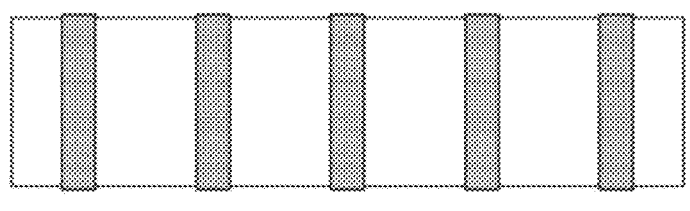
FIG. 4A
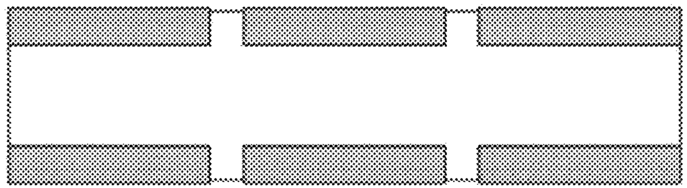
FIG. 4B
FIG. 4C
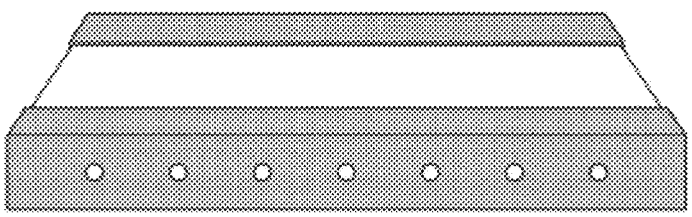
FIG. 4D
| | 4A Ref | 4B 3Point | 4C All | 4D All+hole |
|---|---|---|---|---|
| 12hr | | | | |
| wetting | 100% | 97.1% | 87.2% | 98.5% |
FIG. 5

ELECTRODE ASSEMBLY

CROSS-REFERENCE TO RELATED APPLICATION

The present application is a national phase entry under 35 U.S.C. § 371 of the International Application No. PCT/KR2021/014508 filed on Oct. 18, 2021, which claims priority from Korean Patent Application No. 10-2020-0135121, filed on Oct. 19, 2020, the disclosures of which are incorporated herein by reference in their entireties.

FIELD OF THE INVENTION

The present invention relates to an electrode assembly. A separator is prevented from folding in the electrode assembly, insertability when the electrode assembly is inserted into a tight battery case is remarkably improved, and the electrode assembly is prevented from bending when the electrode assembly is picked up and moved. The electrode assembly has excellent wetting characteristics while having the above advantages.

BACKGROUND OF THE INVENTION

Recently, the price of energy sources is increasing due to the depletion of fossil fuels, interest in environmental pollution is growing, and demands for eco-friendly alternative energy sources have become an indispensable factor for the future life. Accordingly, research on technologies for generating various powers such as photovoltaic, wind, and tidal powers is continuing, and power storage devices such as batteries for more efficiently using the generated electric energy are also drawing much attention.

Furthermore, as technical development and demands for electronic mobile devices and electric vehicles using batteries increase, demands for batteries as energy sources are rapidly increasing. Accordingly, lots of research on the batteries capable of coping with these various demands are being carried out.

Particularly, in terms of materials, there are high demands for lithium secondary batteries, such as lithium ion batteries and lithium ion polymer batteries, having advantages such as the high energy density and discharge voltage and the output stability.

Depending on the shape of a battery case, secondary batteries may be classified as a cylindrical or prismatic battery having an electrode assembly mounted in a cylindrical or prismatic metal can and a pouch-type battery having an electrode assembly mounted in a pouch-shaped case made of an aluminum laminate sheet.

Also, the electrode assembly mounted in the battery case is a chargeable and dischargeable power-generating element having a stack structure of a positive electrode/a separator/a negative electrode, and these electrode assemblies may be classified into: a jelly-roll type structure formed by interposing a separator between a positive electrode and a negative electrode, each of which has the form of a long sheet coated with an active material, and then winding the same; a stacked type structure formed by sequentially stacking a plurality of positive electrodes and negative electrodes having predetermined sizes with separators therebetween; and a stack/folding type structure formed by winding a bicell or full cell in which a predetermined unit of a positive electrode and a negative electrode are stacked with a separator therebetween.

FIG. 1 is a perspective view illustrating an electrode assembly 1 according to the related art. Referring to FIG. 1, in order to fix an electrode stack 10 formed by alternately stacking electrodes 11 and separators 12, a tape 30 having a predetermined band shape was used by being attached around the electrode stack 10 according to the related art. FIG. 1 illustrates that tapes are wound and attach ed around the stack of electrodes after five points are determined. The electrode stack 10 includes electrode tabs 13, two short sides 14, and two long sides 15.

However, the electrode assembly 1 having the above configuration has a portion between the tape 30 and the tape 30 through which only a separator 12 is exposed lengthwise, and thus, the separator 12 was folded backward due to buoyancy when an electrolyte was injected or when a pouch was filled with an electrolyte. Generally, an edge portion of the separator 12 is folded. Also, parts for fixing the electrode stack 10 were only tapes 30 having a band shape, and thus, a fixing force was relatively weak. Also, the fixing force is weak in a long cell, and thus, a bending phenomenon occurs severely when the electrode stack is lifted.

BRIEF SUMMARY OF THE INVENTION

The present invention has been made to solve the above problems, and an object of the present invention is to provide an electrode assembly. A separator is prevented from folding in the electrode assembly, insertability when the electrode assembly is inserted into a tight battery case is remarkably improved, and the electrode assembly is prevented from bending when the electrode assembly is picked up and moved. The electrode assembly has excellent wetting characteristics while having the above advantages.

An electrode assembly according to the present invention includes an electrode stack formed by alternately stacking an electrode and a separator; and an outer tape attached to an outer surface of the electrode stack, wherein the outer tape is attached to the electrode stack to surround a side surface thereof, and a through-hole is formed in a first region of the outer tape which is present at a position corresponding to the side surface of the electrode stack.

The outer tape may be attached to the electrode stack to surround the entire side surface thereof with respect to a longitudinal direction (L) thereof.

The electrode stack may have a quadrangular shape with two long sides and two short sides when viewed from above in a plan view, and the outer tape may be attached to the electrode stack to surround side surfaces thereof that correspond to the two long sides.

The outer tape may have a shape continuous in a longitudinal direction of the electrode stack and may be attached to the electrode stack to surround each of two side surfaces thereof that correspond to the two long sides.

In the electrode stack, the two short sides are sides in which electrode tabs may be present, and the two long sides may be sides in which electrode tabs are not present.

The outer tape may include a second region extending in a width direction (W) of the electrode stack and attached to a top surface of the electrode stack.

The outer tape may include a third region extending in a width direction of the electrode stack and attached to a bottom surface of the electrode stack.

The through-hole may be formed in a circular shape having a diameter of 0.5 mm to 2.5 mm.

The through-hole may be formed in a circular shape having a diameter of 1 mm to 2 mm.

A plurality of through-holes may be formed, and the plurality of through-holes may be formed at equal intervals along a longitudinal direction of the electrode stack.

A plurality of through-holes may be formed, and the plurality of through-holes may be formed at intervals (d) of 3 cm to 7 cm along a longitudinal direction of the electrode stack.

A plurality of through-holes may be formed, and the plurality of through-holes may be formed at intervals (d) of 4 cm to 6 cm along a longitudinal direction of the electrode stack.

The through-hole may be positioned at a center of the electrode stack with respect to a thickness direction (Z) thereof.

An electrode assembly according to the present invention includes an electrode stack formed by alternately stacking an electrode and a separator and an outer tape attached to an outer surface of the electrode stack. The outer tape is attached to the electrode stack to surround a side surface thereof, and a through-hole is formed in a first region of the outer tape which is present at a position corresponding to the side surface of the electrode stack. Accordingly, the separator is prevented from folding in the electrode assembly, insertability when the electrode assembly is inserted into a tight battery case is remarkably improved, and the electrode assembly is prevented from bending when the electrode assembly is picked up and moved. Thus, it is possible to achieve the electrode assembly with excellent wetting characteristics while having the above advantages.

BRIEF DESCRIPTION OF THE DRAWINGS

FIGS. 4A-4D are views illustrating electrode assemblies of an embodiment according to the present invention and comparative examples.

FIG. 5 is a table illustrating experimental results of wetting characteristics for the embodiment according to the present invention and the comparative examples.

Figure 1:
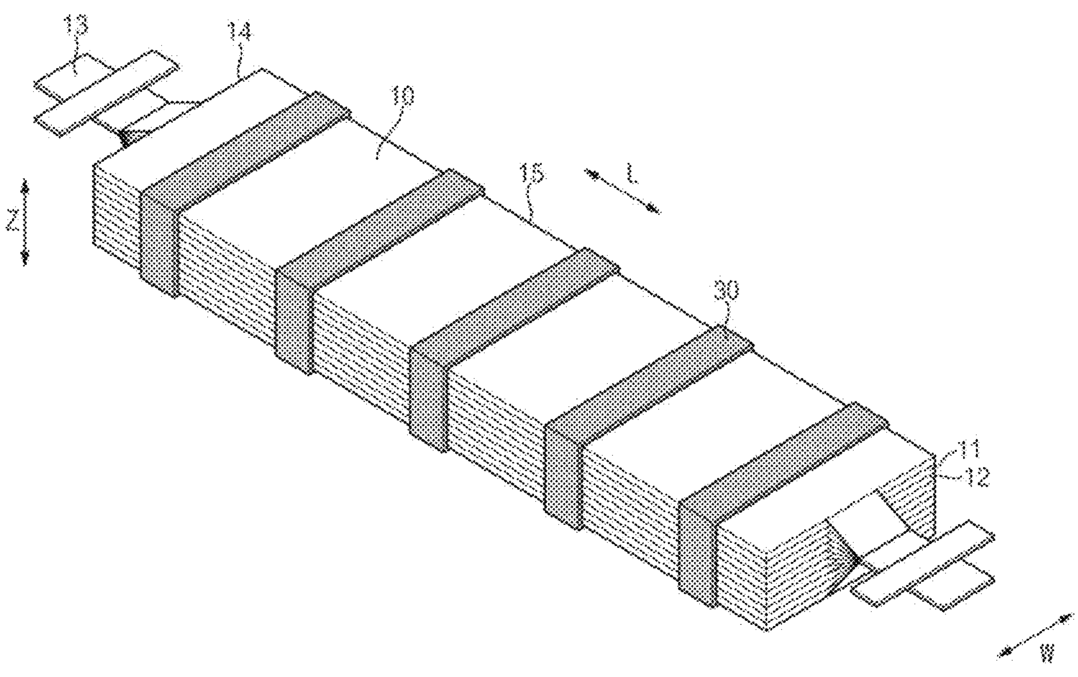
FIG. 1 is a perspective view illustrating an electrode assembly according to the related art.

Hereinafter, preferred embodiments of the present invention will be described in detail with reference to the accompanying drawings so as to be easily carried out by a person skilled in the art to which the present invention pertains. However, the present invention may be embodied in various different forms, and is neither limited nor restricted to the following embodiments.

In order to clearly describe the present invention, parts irrelevant to the description are omitted, and descriptions related to well-known functions or configurations are ruled out so as not to unnecessarily obscure subject matters of the present invention. In the specification, when reference numerals are given to components in each of the drawings, the same or similar components will be designated by the same or similar reference numerals throughout the specification.

Also, terms or words used in this specification and claims should not be restrictively interpreted as ordinary meanings or dictionary-based meanings, but should be interpreted as meanings and concepts conforming to the technical ideas of the present invention on the basis of the principle that an inventor can properly define the concept of a term to describe his or her invention in the best ways.

EMBODIMENT 1

Figure 2:
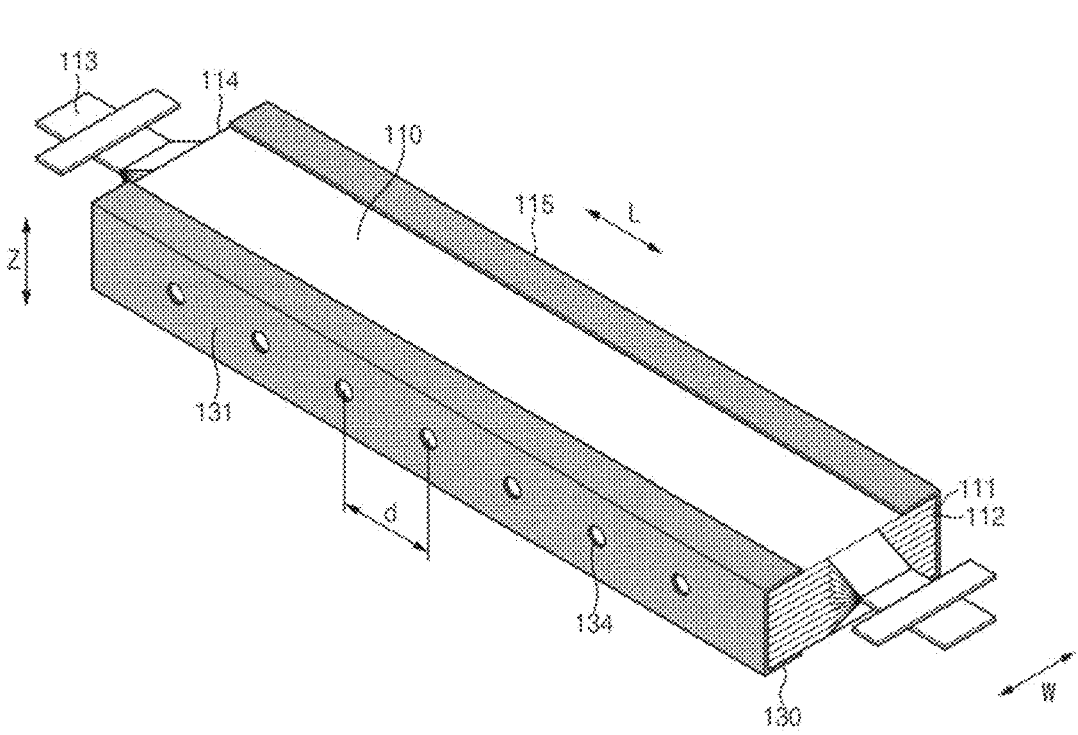
FIG. 2 is a perspective view illustrating an electrode assembly of Embodiment 1.

FIG. 2 is a perspective view illustrating an electrode assembly of Embodiment 1.

Referring to FIG. 2, an electrode assembly 100 according to Embodiment 1 of the present invention includes an electrode stack 110 and an outer tape 130. The electrode stack 110 may be formed by alternately stacking electrodes 111 and separators 112. The outer tape 130 may be configured to have the form of a tape attached to the outer surface of the electrode stack 110. The tape may have the form of a base material and an adhesive material applied on one surface of the base material. In addition, the tape may have a base material that has its own adhesiveness. The outer tape 130 may be attached to the electrode stack 110 so as to surround the side surface thereof. In the electrode assembly 100 according to Embodiment 1 of the present invention, a through-hole 134 is formed in a first region 131 of the outer tape 130 which is present at a position corresponding to the side surface of the electrode stack 110.

The electrode assembly 100 according to Embodiment 1 of the present invention has the above configuration, and thus, a separator 112 may be prevented from folding in the electrode assembly 100. Due to the outer tape, the separator 112 may be prevented from fluttering or folding in an edge portion. Also, the edge of the separator is tightly surrounded by the tape, and thus, it is possible to remarkably improve insertability when the electrode assembly 100 is inserted into a battery case manufactured to be tightly fitted to the size of the electrode assembly 100.

The outer tape 130 may be attached to the electrode stack 110 so as to surround the entire side surface thereof with respect to a longitudinal direction L thereof.

In the electrode assembly 100 according to Embodiment 1 of the present invention, the electrode stack 110 may have a quadrangular shape with two long sides 115 and two short sides 114 when viewed from above in a plan view. In this case, the outer tape 130 may be attached to the electrode stack 110 to surround side surfaces thereof that correspond to the two long sides 115.

Since having the above feature, the electrode assembly 100 according to Embodiment 1 of the present invention may prevent bending of the electrode assembly 100 when the electrode assembly 100 is picked up and moved. As the lengths of the long sides 115 increase, the bending may severely occur due to the weight. Bending means that the long sides 115 of the electrode assembly 100 are curved in a round shape. When the outer tape 130 is attached to the long sides 115, tension of the tape is applied thereto, and thus, the long sides 115 are prevented from being curved in a round shape. Accordingly, the electrode assembly 100 may be prevented from bending.

The outer tape 130 may have a shape continuous in the longitudinal direction of the electrode stack 110 and may be attached to the electrode stack 110 to surround each of two side surfaces thereof that correspond to the two long sides 115. In the electrode stack 110, the two short sides 114 may be sides in which electrode tabs 113 are present, and the two long sides 115 may be sides in which electrode tabs 113 are not present. Since the outer tapes 130 are attached to the sides in which the electrode tabs 113 are not present, the outer tapes 130 may be attached to the electrode stack 110 so as to surround the entire side surfaces thereof corresponding to the long sides 115 while maintaining the continuous shape.

In the outer tape 130 attached to surround the entire side surfaces, through-holes 134 may be formed at predetermined distances in the longitudinal direction of the electrode stack 110. An electrolyte may permeate the inside of the electrode stack 110 via through-holes 134. Through this, the electrode assembly 100 may be wetted.

In the electrode assembly 100 according to Embodiment 1 of the present invention, the through-hole 134 may have a diameter of 0.5 mm to 2.5 mm and may be formed in a circular shape.

When the through-hole 134 has a large diameter of 2.5 mm or more, there is a risk that the holding tension of the tape is weakened. When the diameter is less than about 0.5 mm, there may be a problem with electrolyte wetting.

Particularly, as examined in Experimental Example of the present invention described below, in the electrode assembly 100 according to Embodiment 1 of the present invention, the through-hole 134 may be formed in a circular shape having a diameter of 1 mm to 2 mm so as to achieve the best wetting performance.

Meanwhile, a plurality of through-holes 134 may be formed, and the plurality of through-holes 134 may be formed at equal intervals along the longitudinal direction of the electrode stack 110. Through this, the electrode assembly 100 having a well-balanced battery performance may be manufactured.

Also, in the electrode assembly 100 according to Embodiment 1 of the present invention, a plurality of through-holes 134 may be formed, and the plurality of through-holes 134 may be formed at intervals d of 3 cm to 7 cm along the longitudinal direction of the electrode stack 110 (for an interval d, see FIG. 2).

When the interval between the through-holes 134 has a large value of 7 cm or more, there may be a problem with electrolyte wetting. Also, when the interval between the through-holes 134 has a small value of 3 cm or less, i.e., when the through-holes 134 are arranged very densely, there may be a problem in that a portion of the outer tape 130 on the side surface of the electrode stack 110 is torn in the longitudinal direction. Accordingly, it is desirable that the plurality of through-holes 134 are formed at intervals d of 3 cm to 7 cm along the longitudinal direction of the electrode stack 110.

Particularly, as examined in Experimental Example of the present invention described below, in the electrode assembly 100 according to Embodiment 1 of the present invention, the plurality of through-hole 134 may be formed at intervals d of 4 cm to 6 cm along the longitudinal direction of the electrode stack 110 so as to achieve the best wetting performance while preventing tearing of the outer tape.

Meanwhile, in the electrode assembly 100 according to Embodiment 1 of the present invention, the through-hole 134 may be positioned at a center of the electrode stack 110 with respect to a thickness direction Z thereof. Through this, the maximization of wetting efficiency may be achieved.

As examined above, the present invention may provide an electrode assembly 100. Here, the separator is prevented from folding in the electrode assembly 100, the insertability when the electrode assembly 100 is inserted into the tight battery case is remarkably improved, and the electrode assembly 100 is prevented from bending when the electrode assembly 100 is picked up and moved. Also, it is possible to achieve the excellent wetting characteristics while having the above advantages.

EMBODIMENT 2

Figure 3:
FIG. 3 is a perspective view illustrating an electrode assembly of Embodiment 2.
Figure 3:
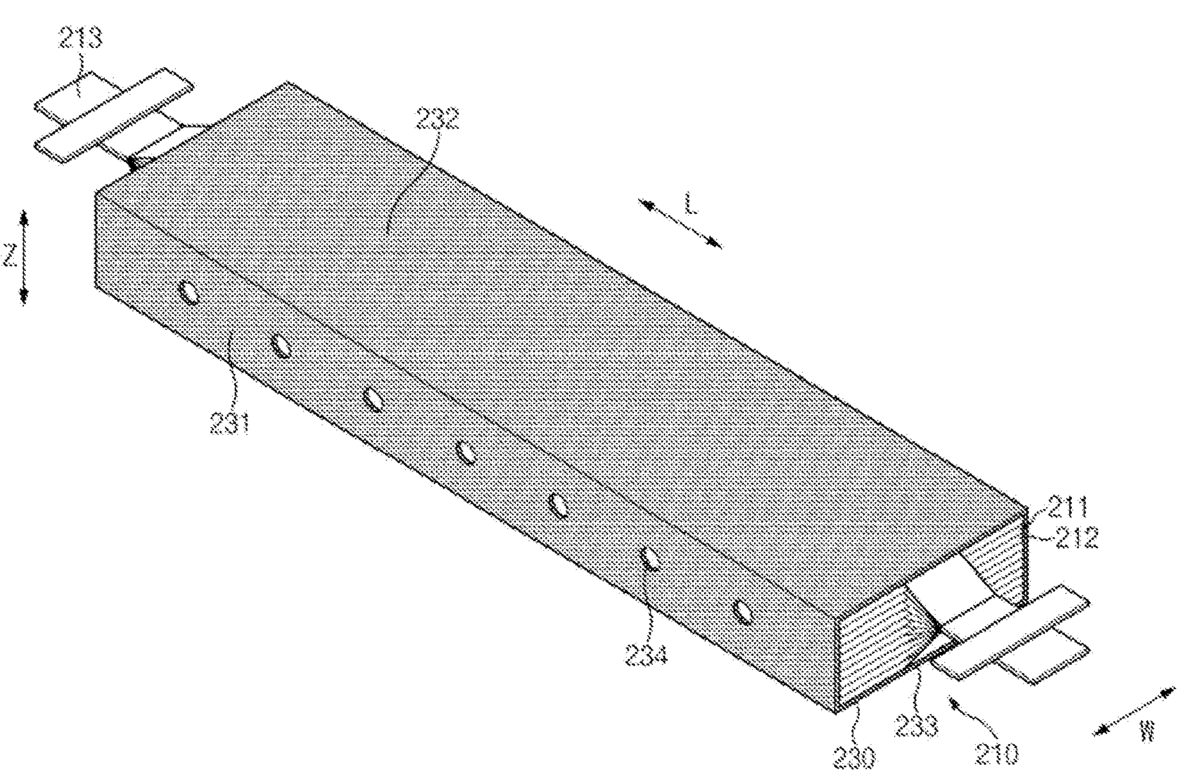

FIG. 3 is a perspective view illustrating an electrode assembly of Embodiment 2.

Embodiment 2 of the present invention may be different from Embodiment 1 in that an attachment area of an outer tape 230 is further widened in an electrode stack.

Embodiment 2 will be described with a focus on the differences, and the features common to Embodiment 1 will be omitted as much as possible. That is, it is obvious that features not described in Embodiment 2 may be regarded as the features of Embodiment 1 if necessary.

Referring to FIG. 3, an electrode assembly 200 according to Embodiment 2 of the present invention may also include an electrode stack 210 and an outer tape 230. The electrode stack 210 may be formed by alternately stacking electrodes 211 and separators 212. The outer tape 230 may be configured to have the form of a tape attached to the outer surface of the electrode stack 210. The outer tape 230 may be attached to the electrode stack 210 so as to surround the side surface thereof. Also, a through-hole 234 may be formed in a first region 231 of the outer tape 230 which is present at a position corresponding to the side surface of the electrode stack 210.

The outer tape 230 may be attached to the electrode stack 210 so as to surround the entire side surface thereof with respect to a longitudinal direction L thereof. The electrode stack 210 may have a quadrangular shape with two long sides and two short sides when viewed from above in a plan view. The outer tape 230 may be attached to the electrode stack 210 to surround side surfaces thereof that correspond to the two long sides.

Particularly, in the electrode assembly 200 according to Embodiment 2 of the present invention, the outer tape 230 may include a second region 232 extending in a width direction W of the electrode stack 210 and attached to a top surface of the electrode stack 210. Also, the outer tape 230 may include a third region 233 extending in the width direction W of the electrode stack 210 and attached to a bottom surface of the electrode stack 210.

The outer tape 230 may be made in the form of an integrated tape attached over the first region 231, the second region 232, and the third region 233. Also, all the tape attached to the first region 231, the second region 232, and the third region 233 may be individually separated. In addition, any two regions of the first region 231, the second region 232, and the third region 233 may be integrated, and the remainder may be separated.

When the outer tape 230 attached on the top surface and the bottom surface of the electrode stack 210 is present as described above, the pressure applied to the electrode stack 210 by the outer tape 230 may further increase, and thus, the effects of the present application may further increase. Thus, a separator 212 is further prevented from folding in the electrode assembly 200, insertability when the electrode assembly 200 is inserted into a tight battery case is further remarkably improved, and the electrode assembly 200 is further prevented from bending when the electrode assembly 200 is gripped and moved.

Also, when the outer tape 230 attached on the top surface and the bottom surface of the electrode stack 210 is present, an electrode 211 or a separator 212 positioned on the top surface or the bottom surface may be prevented from being damaged by an external object. The electrode 211 or the separator 212 positioned on the top surface or the bottom surface of the electrode stack 210 is likely to be scratched or damaged when colliding with an external object or the like.

However, these scratch or damage may be prevented when the outer tape 230 is attached to the top surface and the bottom surface.

COMPARATIVE EXAMPLE 1

FIG. 4A is a plan view illustrating an electrode assembly of Comparative Example 1. An electrode stack was made by alternately stacking electrodes and separators, and an outer tape having a band shape was attached to side surfaces of the electrode stack. Here, an electrode assembly of Comparative Example 1 was manufactured by winding and attaching outer tapes around the electrode stack after determining five points.

COMPARATIVE EXAMPLE 2

FIG. 4B is a plan view illustrating an electrode assembly of Comparative Example 2. An electrode stack was made by alternately stacking electrodes and separators, and an outer tape having a rectangular shape was attached to side surfaces of the electrode stack. Here, an electrode assembly of Comparative Example 2 was manufactured by winding and attaching outer tapes having 12 cm around the electrode stack after determining three portions. The outer tapes at three portions were spaced apart from one another at intervals less than the length (12 cm) of the outer tape with respect to the longitudinal direction and attached thereto.

COMPARATIVE EXAMPLE 3

FIG. 4C is a plan view illustrating an electrode assembly of Comparative Example 3. An electrode stack was made by alternately stacking electrodes and separators, and an outer tape having a long rectangular shape was attached to side surfaces of the electrode stack. Here, the outer tape has a continuous shape so as to entirely cover each of the side surfaces of the electrode stack, and an electrode assembly of Comparative Example 3 was manufactured by winding and attaching the outer tapes around both side surfaces of the electrode stack. In Comparative Example 3, a through-hole is not formed in the outer tape.

EMBODIMENT 1

FIG. 4D is a perspective view illustrating an electrode assembly of Embodiment 1. An electrode assembly according to Embodiment 1 was manufactured by making a plurality of through-holes in a region of the outer tape which is present at a position corresponding to the side surface of the electrode stack of the electrode assembly manufactured in Comparative Example 3. The through-holes were made at intervals of 5 cm (d=5 cm), and each of the through-holes was formed having a diameter of 1 mm to 2 mm. The electrode assembly of Embodiment 1 manufactured as described above is the same as Comparative Example 3 except for the through-holes formed in the outer tape on the side portion of the electrode stack.

EXPERIMENTAL EXAMPLE

Secondary batteries were made by putting each of the electrode assemblies of FIGS. 4A-4D described above into a pouch together with an electrolyte, and then, kept for 12 hours. The secondary batteries were kept upright instead of being laid down, and then subjected to the predetermined identical plate pressure (that is, the secondary batteries are pressed from both sides using a plate, but the predetermined pressure required for wetting is equally applied to all of the assemblies of FIGS. 4A-4D). After being kept for 12 hours and disassembled, wetting areas of positive electrodes were measured. The degrees of wetting were measured by measuring the area of the wetting region in each of the electrode assemblies.

FIG. 5 is a table illustrating experimental results of wetting characteristics for the embodiment according to the present invention and the comparative examples.

Referring to the table of FIG. 5, 4A represents a case in which a product according to the related art is provided as a reference product. Only 5 point portions are surrounded by band-shaped parts, and thus, most of side surfaces have open shapes. Therefore, the wetting characteristics of 100% were obtained. In this case, the wetting characteristics is 100%, but it is not possible to solve the problem in which the separator is folded backward when an electrolyte is injected. Also, the fixing force is weak, and thus, it is also not possible to solve the problem in which a bending phenomenon occurs severely when the electrode stack is lifted.

In the case of 4B, the wetting area of 97.1% was obtained with respect to the total area of an electrode. That is, the result of wetting characteristics of 97.1% was obtained. Although the wetting characteristics are excellent, it is not possible to show the effect of completely preventing folding of a separator or improving a fixing force because the outer tapes are separated from each other. That is, since an open portion is present in a portion in which a space between the tapes is present, and thus, the folding of the separator may occur in a region between the tape and the tape. Also, the tapes are separated, and bending of an electrode is still possible. Thus, it is not possible to sufficiently solve the problem in which the electrode stack is bent when lifted.

In the case of 4C, the wetting area of 87.2% was obtained with respect to the total area of an electrode. That is, the result of wetting characteristics of 87.2% was obtained. That is, although an electrode assembly having a type of 4C may be improved in folding of the separator or in bending of the electrode, wetting characteristics may be failed. Thus, it is not possible to obtain a good product.

In the case of 4D, the wetting area of 98.5% was obtained with respect to the total area. That is, the result of wetting characteristics of 98.5% was obtained. This indicates that excellent wetting characteristics are exhibited. In 4D that is Embodiment 1 of the present invention, the sufficient tension and fixing force are exhibited with the continuous tape shape. Thus, it is possible to solve the problem in which the separator is folded backward when an electrolyte is injected, and it is also possible to solve the problem in which the bending phenomenon occurs when the electrode stack is lifted. Furthermore, as shown in the experimental results, excellent wetting characteristics are exhibited, and thus, a secondary battery having good qualities may be manufactured.

Although the present invention is described by specific embodiments and drawings, the present invention is not limited thereto, and various changes and modifications may be made by a person skilled in the art to which the present invention pertains within the technical idea of the present invention and equivalent scope of the appended claims.

DESCRIPTION OF THE SYMBOLS

100, 200: Electrode assembly
110, 210: Electrode stack
111, 211: Electrode

112, 212: Separator
113: Electrode tab
114: Short side
115: Long side
130, 230: Outer tape
131, 231: First region
232: Second region
233: Third region
134, 234: Through-hole

The invention claimed is:

1. An electrode assembly comprising:

an electrode stack formed by alternately stacking an electrode and a separator; and an outer tape attached to an outer surface of the electrode stack, wherein the outer tape is so attached to the electrode stack as to surround a side surface thereof, and a through-hole formed in a first region of the outer tape, the outer tape present at a position corresponding to the side surface of the electrode stack, wherein the through-hole comprises a plurality of through-holes, and the plurality of through-holes are formed at intervals (d) of 3 cm to 7 cm along a longitudinal direction of the electrode stack.

2. The electrode assembly of claim 1, wherein the outer tape is so attached to the electrode stack as to surround the entire side surface thereof with respect to the longitudinal direction (L) thereof.

3. The electrode assembly of claim 1, wherein the electrode stack has a quadrangular shape with two long sides and two short sides when viewed from above in a plan view, and the outer tape is so attached to the electrode stack as to surround side surfaces thereof that correspond to the two long sides.

4. The electrode assembly of claim 3, wherein the outer tape has a shape continuous in the longitudinal direction of the electrode stack and is so attached to the electrode stack as to surround each of two side surfaces thereof that correspond to the two long sides.

5. The electrode assembly of claim 3, wherein in the electrode stack, the two short sides are sides in which electrode tabs are present, and the two long sides are sides in which electrode tabs are not present.

6. The electrode assembly of claim 1, wherein the outer tape comprises a second region extending in a width direction (W) of the electrode stack and attached to a top surface of the electrode stack.

7. The electrode assembly of claim 1, wherein the outer tape comprises a third region extending in a width direction of the electrode stack and attached to a bottom surface of the electrode stack.

8. The electrode assembly of claim 1, wherein the through-hole is formed in a circular shape having a diameter of 0.5 mm to 2.5 mm.

9. The electrode assembly of claim 1, wherein the through-hole is formed in a circular shape having a diameter of 1 mm to 2 mm.

10. The electrode assembly of claim 1, wherein the through-hole comprises a plurality of through-holes, and the plurality of through-holes are formed at equal intervals along the longitudinal direction of the electrode stack.

11. The electrode assembly of claim 1, the plurality of through-holes are formed at intervals (d) of 4 cm to 6 cm along the longitudinal direction of the electrode stack.

12. The electrode assembly of claim 1, wherein the through-hole is positioned at a center of the electrode stack with respect to a thickness direction (Z) thereof.

* * * * *